3,714,138
LOW TEMPERATURE POLYMERIZATION OF
CYCLIC POLYENES
Charles F. Cook, Bartlesville, Okla., assignor to Phillips Petroleum Company
No Drawing. Filed Mar. 9, 1970, Ser. No. 17,889
Int. Cl. C08f 1/66, 7/02
U.S. Cl. 260—93.1    8 Claims

ABSTRACT OF THE DISCLOSURE

Cyclic polyolefinic compounds are polymerized with a catalyst of tungsten oxide or sulfide or oxide of Group V–B metals or tellurium, on silica or thoria, at temperatures of less than 150° C. to form polyunsaturated hydrocarbons of higher molecular weight.

---

This invention relates to an improved method for the polymerization of cyclic polyolefinic compounds.

According to the process of this invention, cyclic polyolefinic compounds are converted to valuable dimers, trimers, and other higher molecular weight polymers. For example, cyclohexadiene can be utilized to prepare polycyclohexadiene. Heretofore, relatively high reaction temperatures of the order of 200 to 500° C. have been required in the reaction zone in order to achieve dimerization and higher polymerization.

I have discovered that reaction temperatures below about 150° C. are feasible through the use of a catalyst of tungsten oxide or sulfide, or an oxide of Group V–B metals or of tellurium, on a support of silica or thoria. These relatively low temperatures are effective and result in good yields. Such significantly lower temperatures mean lower heat requirements, simpler reaction processes, and much more economical reaction equipment.

It is an object of my invention to provide an improved process for the polymerization of cyclic polyolefinic compounds. It is a further object of my invention to provide a more effective and economical method for polymerizing cyclic polyolefinic compounds through the use of relatively low reaction temperatures.

Other aspects, objects, and the several advantages of my invention will be apparent to one skilled in the art from the following description and appended claims.

The catalysts which are suitable for use in my invention are the oxides of tungsten, vanadium, niobium, tellurium, or tantalum; or a compound of any of these convertible to an oxide on calcination; or a sulfide of tungsten; on a support of silica or thoria or a support containing silica or thoria or both. The support can include such as silica-thoria, silica-alumina, silica-titania, silica-alumina-beryllia, and mixtures thereof. The preferred catalyst is tungsten oxide $WO_3$ on silica. The catalysts described contain from 0.1 to 30 weight percent of the promoter material, such as tungsten oxide, based on the weight of the total catalyst composition.

Reaction conditions according to my process include a reaction temperature below about 150° C., preferably from about 0 to 150° C., more preferably from 20 to 90° C., which low reaction temperatures with the catalysts listed I consider the real breakthrough of my invention.

The preferred monomers within the general group of cyclic polyolefinic monomers which can be converted to higher molecular weight polymeric compounds by the process of my invention include those having from 4 to 12 carbon atoms in any one ring, from 2 to 4 double bonds in a ring, and from 0 to 10 substituent alkyl groups, each alkyl group containing from 1 to 4 carbon atoms per radical or from 0 to 2 substituent aryl, alkaryl, or aralkyl groups, such that the total number of carbon atoms per molecule does not exceed 20.

Some specific and nonlimiting examples of cyclic polyolefinic compounds which can be employed as monomers include those having more than one ring such as bicyclo [2.2.1]hepta-2,5-diene or norbornadiene, and the like: alkyl, aryl, aralkyl, and alkaryl substituted compounds such as 2-methyl-6-ethylcyclooctadiene-1,4, and the like; conjugated and nonconjugated compounds containing two or more double bonds such as 1,5-cyclooctadiene, 1,5,9-cyclododecatriene, 1,4,7,10 - cyclododecatetraene; 1,4-cyclooctadiene, 1,5-cyclononadiene, 1,5-cyclodecadiene, 1,3-cyclodecadiene, 1,3-cyclooctadiene, 2-methyl-6-ethylcyclooctadiene-1,4, and the like.

The following examples illustrate the effectiveness of my low temperature polymerization process. The runs are intended to be illustrative and not limitative of my invention.

EXAMPLE I

The catalyst used contained approximately 6.1 weight percent tungsten oxide as $WO_3$ on a support of silica $SiO_2$. The catalyst was activated by subjecting it to a dry oxygen purge for 2 hours at 600° C., followed by evacuation of the vessel containing the catalyst for 1 hour at 600° C.

In the polymerization procedure utilized, 11 cc. (cubic centimeters) of 1,3-cyclohexadiene of 99.3 percent purity were added to 5 g. (grams) of the activated catalyst and the reaction allowed to proceed at 25° C. in a sealed vessel. After a reaction time of approximately 1 hour, the vessel was opened to the atmosphere and excess feedstock of approximately 1.5 cc. decanted. Mass spectographic analysis of the decanted liquid showed the liquid to be essentially unreacted 1,3-cyclohexadiene with a minor amount of material nonvolatile at 204° C.

Benzene was added to the material remaining in the reaction vessel in an amount sufficient to disperse the polymeric material adhering to the catalyst, and the mixture allowed to stand for 3 hours. The material in the reaction vessel changed from tan to dark gray during the immersion-in-benzene interval. After 3 hours, the benzene dispersion was decanted into a container, and the benzene evaporated under a stream of nitrogen.

The solid material remaining was dissolved in chloroform and filtered to remove any insoluble impurities. The polymeric material was precipitated by the addition of acetone and separated by filtration. Remaining traces of solvent were removed in vacuo for approximately 6 hours, then with a diffusion pump for an additional 3 hours. 1.15 g. of polymer was obtained as a product having a $M_W$ of about 4000.

This run demonstrates the effectiveness of the catalysts in my low temperature process. The run produced a polymer of suitable molecular weight for molded articles.

EXAMPLE II

Using the catalyst composition and procedure as described in Example I above, 2.5 cc. of 1,3-cyclohexadiene were added to 0.75 g. of the catalyst, and the materials then heated in a closed vessel for 5 hours at a temperature maintained between 75 and 90° C. The vessel was then opened to the atmosphere, and liquid removed.

The liquid was qualitatively analyzed by high resolution mass spectrometry and shown to consist of monomer, dimer, and trimers of 1,3-cyclohexadiene. These mass spectrometry measurements required vacuum distillation at 200° C. and these results are consistent with an average molecular weight of 620 as measured by ebullioscopy.

The solid polymer was recovered as described in Example I and subjected to analysis. The average molecular weight of this polymer was determined to be about 1800 by ebullioscopy. This is a molecular weight somewhat low for most molding processes, but it is suitable for use as an epoxy accelerator.

EXAMPLE III

Following the methods of Examples I and II above, 2.5 cc. of 1,4-cyclohexadiene of 99.3 percent purity were added to 0.75 g. of prepared tungsten oxide-on-silica catalyst, and the reactants then heated for 5 hours at a temperature maintained between 75 to 90° C. in a closed vessel. The vessel was then opened to the atmosphere, and the liquid poured off.

Analysis of the liquid polymeric material showed an average molecular weight of 620. Mass peaks indicate monomers, dimers, and trimers. The species can be used, in turn, for further polymerization to higher molecular weight species.

EXAMPLE IV

In this run, 3 cc. of 1,3-cyclohexadiene of 95.6 percent purity were added to 0.75 g. of catalyst. The catalyst and general procedure were as described in the preceding examples, using, however, a polymerization temperature of only 25° C. and a reaction time limited to 1 hour. After the 1 hour interval, the reaction vessel was opened to the atmosphere and the liquid poured off. Mass analysis of the liquid showed unreacted 1,3-cyclohexadiene.

Benzene was then added to the solids remaining in the reaction vessel, and left in contact therewith for three days at room temperature. The benzene solution was decanted, and the benzene removed by evaporation. The viscous residue from the benzene solution was analyzed. Mass analysis showed that the material contained monomer, dimeric, trimeric, tetrameric and pentameric products, which may have been produced by thermal cracking of heavier materials by the inlet of the spectrometer.

A portion of the viscous material was dissolved in chloroform, and then acetone was added, resulting in the precipitation of a white solid. The solid material was analyzed and found to correspond to a formula $(C_6H_8)_{50}$:

Analysis.—Found: $C$,[1] 90.2%; $H$,[1] 9.8%; MW, 4000. Calculated: $C$,[1] 89.93%; $H$,[1] 10.07%; MW, 4000.

Comparison of runs in Examples II, III, and IV shows the versatility of my process in preparing materials of various degrees of polymerization. These examples disclose the high effectiveness of my process for converting cyclic polyolefinic compounds into higher molecular weight species by polymerization reactions employing the catalysts as I have stated, and particularly the very low, convenient, and relatively economical reaction temperatures.

In prepartion of the catalysts useful in my invention, a silica or thoria catalytic support, or a compound of silicon or of thorium convertible to the oxide on calcinaation, is combined with a salt such as an oxide of one or other of the metals I have listed hereinbefore, such as tungsten oxide, or a compound of such metal convertible to an oxide on calcination, or a sulfide of tungsten. These catalyst materials can be prepared by intimately mixing the components or convertible compounds such as by producing an aqueous slurry thereof, drying, followed by calcination; by intimately mixing powdered materials together such as by grinding and the like, followed by calcination; by impregnating a silica gel with an aqueous solution of or dispersion of a metal salt such as a tungsten salt followed by drying and calcination; and the like. Calcination temperatures usually are of the order of from 600 to 1200° F. Other methods known to the art which produce such catalysts are useful according to my invention.

The catalysts can be treated with a basic material, if desired, to deactivate any acidic sites present on the catlysts. Treatment with a base minimizes competing side reactions such as double bond isomerization of the feedstock. Useful bases are the alkali and alkaline earth metal oxides or hydroxides, including those of lithium, sodium, potassium, rubidium, cesium, magnesium, calcium, barium and strontium. Preferred bases are potassium hydroxide and sodium hydroxide. The amount of base added can vary between 0.01 to 5 weight percent of the promoted catalyst composite, preferably from 0.5 to 2 weight percent. Other materials can be present in the catalyst composition in minor amount, such as inert materials, or even such as cobalt oxide which has a beneficial effect on such catalysts.

The prepared catalysts can be in the form of powder, granules, pellets, spheres, extrudates, or beads, depending upon the type of contacting technique involved, the type of reactor such as a fluidized or fixed bed, and the like. Either batch or continuous process operation can be utilized. In a batch process, the catalysts usually will comprise from 0.5 to 25 percent by weight of the reaction mixture.

Typical reaction conditions for my polymerization process include a contacting pressure of from 0 to 2000 p.s.i.g., and a reaction time of from 0.1 second to 24 hours. An inert diluent can be used, if desired, ranging in amount up to 90 percent by volume of the reaction mixture. Suitable diluents include the saturated hydrocarbons, both straight and branched chain and cyclics, and mixtures thereof. The particular diluent or mixture of diluents chosen can depend upon the particular cyclic polyolefinic feedstock utilized and the degree of conversion, i.e., the molecular weight of the resulting product or polymer.

The polymers produced can be with molecular weights in the range of from about 1800 to 5000 weight average molecular weights as determined by ebullioscopy, which range finds application in molded articles and the like, as a basis for epoxy resins and/or accelerators, and as a potential source of stabilizing polyolefins. The dimers, trimers and lower molecular weight polymer products can themselves be used as monomers for further polymerization to higher molecular weight polymers.

Reasonable variations and modifications of my invention are possible within the scope of this disclosure without departing from the scope and spirit thereof.

I claim:

1. A process for polymerizing a cyclic polyolefinic compound which comprises contacting said cyclic polyolefinic compound with a catalyst composition consisting essentially of at least one promoter which is niobium oxide, vanadium oxide, or tantalum oxide, on a silica or thoria or silica- or thoria-containing support.

2. A process according to claim 1 wherein said cyclic polyolefinic compound contains from 4 to 12 carbon atoms per ring, from 2 to 4 double bonds per ring, and from 0 to 10 substituent alkyl groups, each said alkyl group containing from 1 to 4 carbon atoms per radical and from 0 to 2 groups selected from aryl, alkaryl, and arylalkyl, such that the total number of carbon atoms per molecule does not exceed 20, and wherein said contacting is conducted at a temperature of less than about 150° C.

3. A process according to claim 2 wherein said catalyst composition contains from about 0.1 to 30 weight percent of said promoter based on the total weight of catalyst composition including support, and said catalyst composition is activated by exposure at elevated temperatures to a molecular oxygen-containing gas prior to said contacting.

4. A process according to claim 3 wherein said catalyst composition is treated with about 0.01 to 5 weight percent of an alkali metal base or alkaline earth metal base prior to said contacting.

5. A process according to claim 3 wherein said contacting is conducted at a temperature in the range of about

---

[1] Corrected to 100 percent. Analysis sum totaled 96 percent, apparently due to included impurities such as $SiO_2$ and oxygenated hydrocarbons.

0 to 150° C., a pressure of about 0 to 2000 p.s.i.g., for a time of about 0.1 second to 24 hours, and includes the use of an inert diluent in the range of 0 to 90 volume percent based on reaction mixture.

6. A process according to claim 3 wherein said base-treated catalyst composition further is treated with a minor amount of a cobalt additive prior to said contacting.

7. A process according to claim 5 wherein said cyclic polyolefinic compound is a diene of 6 to 10 carbon atoms per ring.

8. A process according to claim 6 wherein said diene is cyclohexadiene and said support is silica.

References Cited

UNITED STATES PATENTS

| 3,575,947 | 4/1971 | Crain | 260—93.1 |
| 2,825,721 | 3/1958 | Hogan et al. | 260—88.1 |
| 3,074,918 | 1/1963 | Eleuterio | 260—93.1 |

JAMES A. SEIDLECK, Primary Examiner

R. A. GAITHER, Assistant Examiner

U.S. Cl. X.R.

260—666 A